United States Patent [19]

Kishida et al.

[11] 4,394,560
[45] Jul. 19, 1983

[54] COVERED ELECTRODE CONTAINING ZIRCONIUM FOR SHIELDED METAL ARC WELDING

[75] Inventors: Katsuhiro Kishida; Yutaka Mekuchi, both of Yokohama; Sumio Hirao, Kaminagaya; Hirohiko Date, Yokosuka, all of Japan

[73] Assignee: Nissan Motor Company, Ltd., Yokohama, Japan

[21] Appl. No.: 310,283

[22] Filed: Oct. 9, 1981

[30] Foreign Application Priority Data

Oct. 9, 1980 [JP] Japan ................................ 55-140555

[51] Int. Cl.³ ............................................. B23K 35/30
[52] U.S. Cl. .......................... 219/137 WM; 75/128 C; 75/128 Z; 219/145.23; 219/146.1; 219/146.24; 219/146.41
[58] Field of Search ...................... 219/146.41, 146.24, 219/146.32, 146.22, 146.1, 137 WM, 146.23, 145.22, 145.23; 75/128 C, 128 Z

[56] References Cited

U.S. PATENT DOCUMENTS

| | | | |
|---|---|---|---|
| 2,909,778 | 10/1959 | Landis et al. | 219/146.41 X |
| 3,301,997 | 1/1967 | Semenchuk et al. | 219/146.22 X |
| 3,458,685 | 7/1969 | Tezuka et al. | 219/146.24 |
| 3,764,304 | 10/1973 | Nehrenberg et al. | 75/128 C |
| 3,865,581 | 2/1975 | Sekino et al. | 75/128 Z X |
| 4,010,309 | 3/1977 | Petersen | 219/146.23 X |
| 4,042,383 | 8/1977 | Petersen et al. | 219/146.23 X |
| 4,087,673 | 5/1978 | Kiilunen | 219/146.1 X |
| 4,122,238 | 10/1978 | Frantzerb | 219/146.1 X |

FOREIGN PATENT DOCUMENTS

| | | | |
|---|---|---|---|
| 284475 | 11/1963 | Australia | 219/146.23 |
| 51-100946 | 6/1976 | Japan | 219/146.23 |
| 645958 | 2/1948 | United Kingdom | 219/146.23 |
| 318449 | 12/1971 | U.S.S.R. | 219/146.23 |
| 525515 | 4/1977 | U.S.S.R. | 219/146.22 |

Primary Examiner—R. R. Kucia
Attorney, Agent, or Firm—Schwartz, Jeffery, Schwaab, Mack, Blumenthal & Koch

[57] ABSTRACT

A covered electrode for shielded metal arc welding, which is particularly suitable for use in build-up welding operation for the purpose of providing hard surface to a metal die. The covered electrode comprises such amounts of Ni, Si, B, Nb, C and Zr as essential alloying elements that the deposited metal contains at least 40% of Ni, 3–8% of Si, 0.1–0.5% of B, 0.3–2.0% of Nb, 0.2–1.5% of C and 0.01–0.20% of Zr, all by weight. In a preferred form, either Ni wire or Fe—Ni wire is used as the core wire, and the covering contains necessary amounts of all the essential alloying elements except Ni. The deposited metal has high wear resistance and good antifrictional property, and the presence of Zr is highly effective for preventing the occurrence of weld cracks.

9 Claims, 3 Drawing Figures

COVERED ELECTRODE CONTAINING ZIRCONIUM FOR SHIELDED METAL ARC WELDING

BACKGROUND OF THE INVENTION

This invention relates to a covered electrode for shielded metal arc welding, the covered electrode being of the class containing a relatively large amount of nickel and suitable for use in build-up welding for the purpose of providing hard surface to a metal body such as a metal die made of cast iron.

Currently it is prevailing to use cast iron as the material of relatively large-sized metal dies and fixtures for press-forming of steel sheet. For example, in the automobile industry very large-sized metal dies made of cast iron are used to form panels for car bodies. Of course it is necessary to provide hard surface to such metal dies by a certain kind of surface treatment. According to the recent trend in the design of car bodies, there is an increasing need of performing a very severe and precise stretch forming process to obtain a desirably shaped panel, and therefore greater attention is paid to the wear resistance and antifrictional property of the die face. As will be understood, wear of the die face results in lowering in the dimensional precision of the shaped panel and raises the need for considerable time and labour to repair the die. Where the antifrictional property of the die face is insufficient, the press-forming process is liable to suffer from seizing between the die face and the steel sheet brought into sliding contact with the die face and appearance of scratches on the shaped panel surface or unsatisfactory surface roughness of the shaped panel.

Hard chromium plating is an example of surface treatment techniques to provide a cast iron body with a hard, wear-resistant and fairly antifrictional coating layer. However, in the case of large-sized metal dies for severe stretch forming, the plated chromium layer is liable to peel off the cast iron surface during operation. Therefore, it has been the practice to form a hard coating layer by an overlaying welding or build-up welding process. However, hitherto developed iron base welding materials for this purpose are generally unsatisfactory primarily because of high probability of the occurrence of weld cracks. Besides, the deposited metal resulting from any of these welding materials is insufficient in its antifrictional property, so that the use of a metal die treated by this welding method results in considerable scratching of the shaped article. Furthermore, the treated die face itself undergoes considerable wear. Therefore, in this case it becomes necessary to use a highly effective lubricant in the press-forming process.

Recently developed nickel base welding materials are said to be suitable for use in build-up welding process for the purpose of overlaying cast iron bodies with a hard and antifrictional coating layer. It is true that when these nickel base welding materials are applied to metal dies the probability of scratching of the shaped articles can be greatly reduced. However, these nickel base welding materials are generally insufficient in the wear resistance of the deposited metal, so that the metal dies treated with these welding materials are short in service life and are liable to cause wrinkling of the shaped articles, particularly in the case of shaping large-sized panels.

SUMMARY OF THE INVENTION

It is an object of the present invention to provide a covered electrode for shielded metal arc welding, which electrode gives deposited metal having high wear resistance and good antifrictional property without suffering from weld cracks even when used in welding on a relatively large body of cast iron and accordingly is suitable for use in build-up welding on metal dies.

A covered electrode according to the invention for shielded metal arc welding consists of a core wire and a covering and comprises such amounts of Ni, Si, B, Nb, C and Zr as essential alloying elements that deposited metal given by this electrode contains at least 40% by weight of Ni, 3 to 8% by weight of Si, 0.1 to 0.5% by weight of B, 0.3 to 2.0% by weight of Nb, 0.2 to 1.5% by weight of C and 0.01 to 0.20% by weight of Zr.

Though inessential, this covered electrode may further comprise Fe as an additional alloying element.

It is preferred that the entire quantity of Ni contained in the covered electrode is present in the core wire, whereas the others of the essential alloying elements are all contained in the covering.

Preferably the core wire is either an essentially nickel wire containing at least 95% by weight of Ni or a ferronickel alloy wire containing 50 to 60% by weight of Ni. In either case, the covering is made to comprise 5 to 13% by weight of Si, 1 to 5% by weight of B, 0.4 to 4% by weight of Nb, 1 to 6% by weight of C and 0.1 to 2.0% by weight of Zr as essential alloying elements. Besides, the covering may contain conventional additives that serve as arc-stabilizing, gas-generating, slag-forming and/or lubricating agents.

A covered electrode according to the invention is advantageous principally in that build-up welding operations using this covered electrode can be accomplished without the occurrence of weld cracks practically irrespective of the size and shape of metal bodies as the objectives of the welding, and that deposited metal given by this covered electrode has high wear resistance and good antifrictional properties. Accordingly, this covered electrode is particularly suitable for use in build-up welding for the purpose of providing a hard surface to a metal die for press-forming of steel sheet. By using a metal die overlaid with the deposited metal given by this covered electrode, steel sheet can be press-formed without suffering from seizing between the die face and the steel sheet brought into sliding contact with the die face or scratching of the steel sheet during its sliding contact with the die face, and in most cases it is possible to smoothly accomplish press-forming without using any lubricant.

The present invention has succeeded in practically completely eliminating the possibility of the occurrence of weld cracks during build-up welding operations by introducing an adequate amount of Zr into the covered electrode, and consequentially into the deposited metal. When this covered electrode is used in overlaying of a metal die, even corner regions or otherwise intricately shaped regions of the die can easily and satisfactorily be overlaid with the deposited metal which is free from weld cracks. There is no need of subjecting the metal die to pre- or after-heating treatment or peening treatment with the intention of avoiding weld cracks, so that the build-up welding operations can be performed at greatly reduced cost. Also it is easy to repair a metal die or make a local modification of a metal die by build-up welding using a covered electrode of the invention. Build-up welding operations using this covered electrode can be performed in the manner of alternating-current arc welding.

DESCRIPTION OF THE PREFERRED EMBODIMENTS

Figure 1:
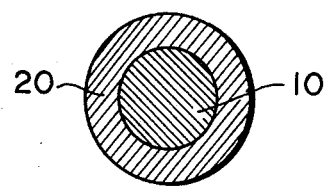
FIG. 1 is a cross-sectional view of a covered electrode according to the invention.

The principal feature of a covered electrode for shielded metal arc welding according to the invention is to contain such an amount of Zr that the deposited metal contains 0.01 to 0.2% by weight of Zr. Other than Zr, the covered electrode is required to contain such amounts of Ni, Si, B, Nb and C that the deposited metal contains at least 40% of Ni, 3 to 8% of Si, 0.1 to 0.5% of B, 0.3 to 2.0% of Nb and 0.2 to 1.5% of C, all by weight. The balance of the deposited metal consists of Fe, which is not essential but usually contained in the covered electrode, and inevitable impurities. For the essential elements of the deposited metal, the upper and lower boundaries of their respective amounts have been determined on the following grounds. In the following description the percentages of the elements are given always by weight.

Zirconium has the effect of rendering structure of the deposited metal fine-grained and, therefore, greatly lowering the susceptibility of the deposited metal to weld cracks. Where only less than 0.01% of Zr is present in the deposited metal this effects augments as the amount of Zr increases, and we have confirmed that the possibility of weld cracks in practical welding operations can be eliminated by allowing the deposited metal to contain at least 0.01% of Zr. The upper boundary of the Zr content in the deposited metal is set at 0.20% because a further increase in the amount of Zr does not bring about any appreciable difference in the probability of appearance of weld cracks.

Nickel affords a good antifrictional property to the deposited metal. In the case of, for instance, a metal die for a press-forming process produced through a build-up welding process using a covered electrode according to the invention, the presence of a sufficient amount of Ni in the deposited metal on the die surface is quite effective for greatly reducing the friction between the die surface and a steel sheet brought into sliding contact with the die surface, so that the press-forming operation can be accomplished without suffering from seizing between the die surface and the steel sheet or scratching of the shaped steel sheet by the die surface. When the content of Ni in the deposited metal is less than 40%, it is likely that a metal sheet brought into sliding contact with the deposited metal will be scratched considerably.

Silicon combines mostly with nickel and iron to form silicon compounds high in hardness and therefore contributes to the enhancement of hardness and wear resistance of the deposited metal. However, this effect is scarcely appreciable and, hence, the wear resistance of the deposited metal is insufficient when the content of Si in the deposited metal is less than 3%. The hardness of the deposited metal continues to augment even when the Si content is increased beyond 8%, but such an increase in the Si content no longer brings about a great enhancement of the wear resistance and, as a more serious problem, causes the deposited metal to become brittle and susceptible to weld cracks.

Boron is effective for enhancement of the hardness and wear resistance of the deposited metal. This effect becomes fully appreciable when the deposited metal contains at least 0.1% of B and is augmented by the co-existence of carbon. The upper boundary of the B content in the deposited metal is set at 0.5% because a further increase in the content of B renders the deposited metal brittle and susceptible to weld cracks and significantly lowers machinability of the deposited metal.

Niobium renders the structure of the deposited metal fine-grained and greatly lowers the susceptibility of the deposited metal to weld cracks. These effects become fully appreciable when the content of Nb in the deposited metal reaches about 0.3%. However, the presence of more than 2% of Nb in the deposited metal leads to the formation of undesirably large amounts of compounds of Nb with Ni or B to result in that the deposited metal becomes excessively hard (e.g. above 380 in Vickers hardness value) and brittle and is liable to suffer from weld cracks.

Carbon in the deposited metal partly intrudes into the alloyed matrix as a constituent of solid solutions and partly exists either in the precipitated state or in the form of carbides combined with Nb and/or B. Therefore, wear resistance of the deposited metal is considerably enhanced when the content of C reaches about 0.2%. This effect of C augments as the amount of C is increased, but it is undesirable to increase the C content beyond 1.5% because it results in an excessive increase in the amounts of the aforementioned carbides and enlargements of the carbide grains so that a metal sheet brought into sliding contact with the deposited metal is liable to be scratched by the edges of the hard and large grains of the carbides.

As shown in FIG. 1, a covered electrode of the invention consists of a core wire 10 and a covering 20 similarly to conventional covered electrodes for shielded metal arc welding.

In the present invention it is preferred that the entire quantity of Ni as one of the above described essential elements of the deposited metal is originally contained in the core wire 10 of the covered electrode. In theory, it is permissible that a portion of the remaining alloying elements, Si, B, Nb, Zr and C, are contained in the core wire 10 in a state alloyed with Ni. In practice, however, this will offer difficulty to the wire drawing operation for the manufacture of the core wire 10 and will consequentially lead to lowered productivity and increased production cost. Therefore, it is preferred that the essential elements of the deposited metal except Ni entirely originate from the covering 20 of a covered electrode according to the invention.

As to the core wire 10, it is possible to use either a so-called pure nickel core wire consisting of at least 95% by weight of Ni and practically inevitable impurities or a less costly ferronickel core wire consisting of 50 to 60% by weight of Ni and the balance of Fe and inevitable impurities. In these two cases, there is no difference in the hereinbefore mentioned limitations to the composition of the covering material. That is, the covering 20 of a covered electrode according to the invention contains 0.1 to 2.0% of Zr, 5 to 13% of Si, 1 to 5% of B, 0.4 to 4% of Nb and 1 to 6% of C, all by weight. For these alloying elements, the upper and lower boundaries of their respective amounts in the covering 20 have been determined so as to meet the above described limitations to the composition of the deposited metal and also with consideration of the following matters. Also, inevitable losses of these elements during welding operations have been taken into consideration.

The covering must contain at least 0.1% of Zr in order to ensure that the deposited metal contains at least 0.01% of Zr. However, when the Zr content in the covering exceeds 2.0% adhesion of the slag to the deposited metal so intensifies that the removal of the slag becomes very difficult, and frequently there occurs slag inclusion particularly in the case of multi-layer welding. Besides, it becomes impossible to form weld beads of good appearance.

The lower boundary of the Si content in the covering is set at 5% to ensure the presence of at least 3% of Si in the deposited metal. Besides the effect of enhancing the hardness and wear resistance of the deposited metal, Si contained in the covering has the effect of improving fluidity of the molten metal and consequentially improving the appearance of the beads. However, it is undesirable to increase the Si content in the covering beyond 13% because the deposited metal becomes brittle and tends to suffer from weld cracks.

The amount of B in the covering is limited within the range from 1 to 5% with a view to ensuring the favorable effect of B on the wear resistance of the deposited metal without rendering the deposited metal too brittle and without sacrificing the operability or usability of the covered electrode. With a similar view, the content of Nb in the covering is limited within the range from 0.4 to 4%.

Carbon contained in the covering serves not only as an alloying element but also as a strong deoxidizing agent. When the amount of C in the covering is less than 1% it is doubtful whether the content of C in the deposited metal will reach the lower boundary of the specified range and, besides, it is difficult to obtain deflect-free beads because of a strong tendency for the beads to contain many pits and blow holes. On the other hand, when the covering contains more than 6% of C the deposited metal is liable to become degraded in its antifrictional property because of the presence of excessively large amounts of carbides. Besides, in the case of using a covered electrode of such a high carbon content it is likely that the blowing power of the welding arc is not strong enough to ensure continuous transfer of the molten metal to the base metal subjected to welding, so that it becomes difficult to obtain continuous beads of good appearance and the beads suffer intense adhesion of the slag thereto.

It is permissible that the covering of a covered electrode of the invention contains some amount of Fe besides the above described essential alloying elements. The presence of Fe offers no problem insofar as the deposited metal given by the electrode contains at least 40% of Ni.

Furthermore, the covering usually contains suitable amounts of conventional additives that serve as arc-stabilizing, slag-forming, gas-generating and/or lubricating agents. Particular examples of such additives are calcium carbonate, barium carbonate, fluorite and mica.

A covered electrode of the invention can be produced by well known methods for the production of conventional covered electrodes for shielded metal arc welding. Usually a binder such as water glass is added to a covering material composition in the form of a powdery mixture of raw materials of the alloying elements and the additives, and the resultant paste-like composition is applied to the core wire. In the present invention, it is recommended that the weight ratio of the covering (in the dry state) to the core wire is in the range from about 20:100 to about 50:100.

EXAMPLES TO 4

In these examples, covered electrodes according to the invention were produced by using a so-called pure nickel core wire. Table 1 shows the result of analysis of this nickel core wire.

TABLE 1

| Nickel Core Wire (Wt %) | | | | | | | |
|---|---|---|---|---|---|---|---|
| C | Si | Mn | P | S | Fe | Ni | other impurity |
| 0.05 | 0.06 | 0.31 | 0.003 | 0.004 | 0.03 | balance | <0.5 |

In Examples 1 to 4, four kinds of covering material compositions were prepared by mixing powdery raw materials so as to contain alloying elements and other additives in the proportions as shown in the following Table 2, respectively. In each composition, Si, B and Nb were present in the form of their respective ferroalloys, and the amount of Fe refers to the total of the Fe components of such ferroalloys.

A suitable amount of water glass was added to the powdery composition of each example, and the resultant sticky composition was applied to the nickel core wire by a usual procedure to produce a covered electrode for shielded metal arc welding. The core wire was 3.2 mm in diameter and 350 mm in length. The weight ratio of the covering to the core wire was about 40:100, and the outer diameter of the covered electrode became 5.4 mm.

REFERENCES 1 AND 2

As Reference 1, the covering material composition of Example 1 was modified by decreasing the amount of Zr beyond the lower limit according to the invention. As Reference 2, the covering material composition of Example 2 was modified by increasing the amount of Zr beyond the upper limit according to the invention. The amounts of the ingredients of the compositions of References 1 and 2 are also shown in Table 2. The covering material compositions of References 1 and 2 were each applied to the aforementioned nickel core wire to produce covered electrodes for comparison with the covered electrodes of Examples 1 and 2.

TABLE 2

| Constituents | Covering Compositions (Wt %) | | | | | |
|---|---|---|---|---|---|---|
|  | Ex. 1 | Ex. 2 | Ex. 3 | Ex. 4 | Ref. 1 | Ref. 2 |
| Si | 11 | 11 | 5 | 5 | 11 | 11 |
| B | 2 | 2 | 1 | 1 | 2 | 2 |
| Nb | 3 | 3 | 0.5 | 0.5 | 3 | 3 |
| C | 3 | 3 | 2 | 2 | 3 | 3 |
| Zr | 0.15 | 1.8 | 0.1 | 2.0 | 0.05 | 3.0 |
| Fe | 24 | 24 | 12 | 12 | 24 | 24 |
| Calcium Carbonate | 21 | 21 | 30 | 29 | 21 | 20 |

TABLE 2-continued

| | Covering Compositions (Wt %) | | | | | |
|---|---|---|---|---|---|---|
| Constituents | Ex. 1 | Ex. 2 | Ex. 3 | Ex. 4 | Ref. 1 | Ref. 2 |
| Barium Carbonate | 11 | 10 | 15 | 14 | 11 | 10 |
| Fluorite | 21 | 20 | 30 | 30 | 21 | 20 |
| Mica | 2 | 2 | 2 | 2 | 2 | 2 |
| Other | 1.85 | 2.2 | 2.4 | 2.5 | 1.95 | 2 |

Each of the covered electrodes produced in Examples 1 to 4 and References 1 and 2 was used in an alternating-current arc welding process at a current intensity of 95–120 A to overlay a cast iron block used as the base metal with the deposited metal. For the tested covered electrodes, the analytical values of the compositions of the deposited metals were as shown in Table 3. When any one of the covered electrodes of Examples 1 to 4 or the electrode of Reference 2 was used, no weld crack was observed. Only in the case of using the electrode of Reference 1 (very small in the content of Zr) there appeared some weld cracks. The hardness values (Vickers hardness) of the deposited metals and the slug conditions are shown in the following Table 4 together with the results of other tests.

TABLE 3

| | Analysis of Deposited Metal (Wt %) | | | | | | |
|---|---|---|---|---|---|---|---|
| | C | Si | B | Nb | Zr | Ni | Fe | Other |
| Ex. 1 | 0.80 | 5.06 | 0.30 | 1.76 | 0.019 | 77.4 | balance | <0.5 |
| Ex. 2 | 0.82 | 5.14 | 0.26 | 1.73 | 0.17 | 78.1 | balance | <0.5 |
| Ex. 3 | 0.50 | 3.24 | 0.15 | 0.41 | 0.012 | 89.3 | balance | <0.5 |
| Ex. 4 | 0.51 | 3.20 | 0.14 | 0.42 | 0.18 | 88.7 | balance | <0.5 |
| Ref. 1 | 0.79 | 5.21 | 0.30 | 1.81 | 0.007 | 78.0 | balance | <0.5 |
| Ref. 2 | 0.80 | 5.18 | 0.29 | 1.72 | 0.23 | 77.6 | balance | <0.5 |

To evaluate the wear resistance and antifrictional property of deposited metal given by each of the covered electrodes of Examples 1 and 4 and References 1 and 2, a combination of a female die and a blank holder for drawing of a steel sheet into a cup having an outer diameter of 35 mm and a height of 15 mm was produced by performing a build-up welding process on the rough-formed die and blank holder of cast iron by using each covered electrode. Each set of the die and blank holder was used in a successive drawing operation to form 10,000 cups from a cold rolled steel sheet having a thickness of 0.4 mm.

Before and after the drawing operation, the surface roughness of each blank holder in a region coming into sliding contact with the steel sheet was measured to the accuracy of 0.1 μm to represent the wear resistance of the deposited metal by the difference of the surface roughness value after the drawing operation from the initial surface roughness value. The results are shown in Table 4.

The antifrictional property of each deposited metal was evaluated by measuring the depth of minute scratches appeared on the cylindrical outer surfaces of the cups formed at the last stage of the drawing operation for each set of the die and blank holder. In the column of antifrictional property in Table 4, the characters A and B represent the following depths of the scratches, respectively.

A: less than 5 μm
B: between 5 and 10 μm

For reference, the surface roughness of the steel sheet subjected to drawing was 3 μm on the average.

TABLE 4

| | Hardness of Deposited Metal (Hv) | Operability at Welding | Wear Resistance | Antifrictional Property | Total Evaluation |
|---|---|---|---|---|---|
| Ex. 1 | 298–312 | excellent | 1.1 μm | A | excellent |
| Ex. 2 | 284–306 | good, slight adhesion of slag | 1.3 μm | B | excellent |
| Ex. 3 | 210–226 | excellent | 1.9 μm | A | excellent |
| Ex. 4 | 208–231 | good, slight adhesion of slag | 1.8 μm | B | good |
| Ref. 1 | 287–308 | excellent, but some weld cracks | 1.3 μm | A | tolerable |
| Ref. 2 | 294–329 | bad, intense adhesion of slag | impossible to test because of slag inclusion | | bad |

The test results presented in Table 4 demonstrate that when hard facing of cast iron is performed by shielded metal arc welding in the manner of build-up welding by using a covered electrode containing such an amount of Zr that the deposited metal contains 0.01–0.20% of Zr, the welded overlayer becomes quite satisfactory in both wear resistance and antifrictional property and does not suffer from weld cracks.

EXPERIMENT

Based on the above Example 1 and Reference 1, an experiment was carried out to more minutely examine the relationship between the content of Zr in the deposited metal and the probability or scale of weld cracks. That is, the covering material composition of Example 1 was modified to several experimental compositions by varying the amount of Zr within the range from 0.02 to 3.0% without varying the amounts of Si (11), B (2%), Nb (3%), C (3%) and mica (2%). The amounts of the carbonate and fluorite were varied according to the varied amounts of Zr. Each of these covering material compositions was applied to the nickel core wire used in Example 1 to obtain a covered electrode.

Each of the sample electrodes thus prepared was used in an experimental build-up welding process to form three layers of five-row beads on the cylindrical outer surface of a cylindrical block of gray cast iron (240 mm in diameter and 150 mm in length). The beads were about 50 mm in width and about 120 mm in length. For each sample, the length of transverse bead cracks appearing in the outermost bead layer was measured to represent the scale of weld cracks by the proportion (percent) of the measured bead crack length to the width of the beads. The result of this experiment is shown in FIG. 2, wherein the content of Zr in the deposited metal is given on the abscissa together with parenthesized amount of Zr in the covering material composition.

Figure 2:
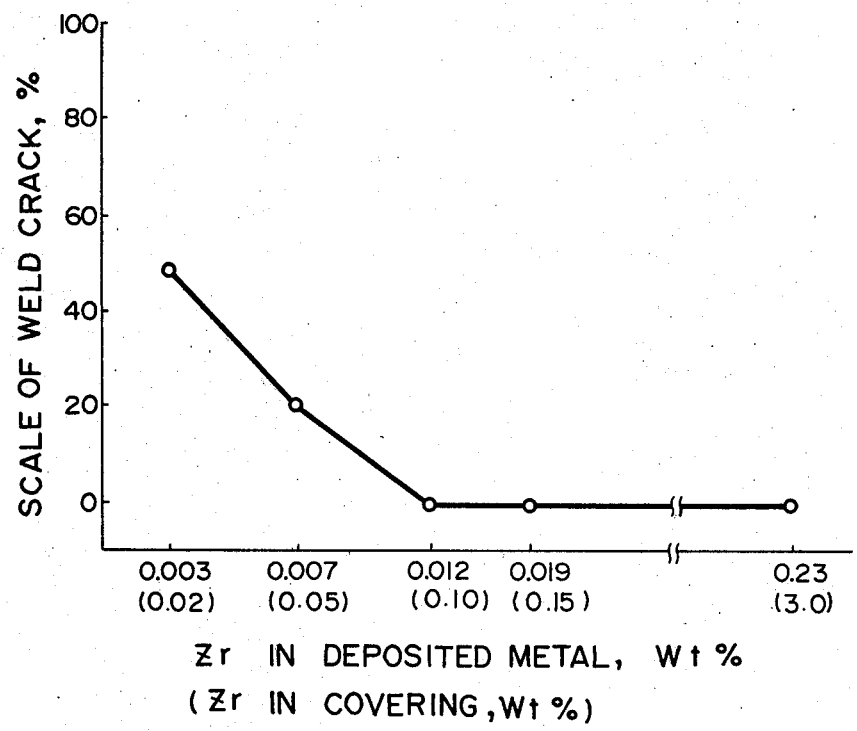
FIG. 2 is a graph showing the relationship between the amount of Zr contained in deposited metal and the scale of weld cracks observed in an experimental shielded metal arc welding operation for hard facing of a cast iron member.

As can be seen clearly in FIG. 2, weld cracks can completely be prevented by using a covered electrode which gives deposited metal containing at least 0.01% by weight of Zr even in a build-up welding operation on cast iron which tends to result in the occurrence of significant weld cracking when a conventional covered electrode is used. However, it is undesirable that the content of Zr in the deposited metal exceeds 0.2% because it results in strong adhesion of the slag to the deposited metal as demonstrated by the use of the covered electrode of Reference 2.

EXAMPLES 5 TO 8

In these examples covered electrodes according to the invention were produced by usig a Fe—Ni core wire far cheaper than the nickel core wire used in Examples 1-4. Table 5 shows the result of analysis of this Fe—Ni core wire.

TABLE 5

| Fe—Ni Core Wire (Wt %) | | | | | | | |
|---|---|---|---|---|---|---|---|
| C | Si | Mn | P | S | Ni | Fe | other impurity |
| 0.02 | 0.12 | 0.57 | 0.012 | 0.011 | 57.20 | balance | <0.5 |

As Examples 5 to 8, four kinds of covering material compositions were prepared by mixing powdery raw materials so as to contain alloying elements and other additives in the proportions as shown in the folowing Table 6, respectively. As can be seen, the amount of Zr was varied without varying the amounts of Si (11%), B (2%), Nb (3%) and C (3%). The total amount of the other additives was varied according to the varied amounts of Zr.

The powdery composition of each example was mixed with water glass and applied to the Fe—Ni core wire to produce a covered electrode for shielded metal arc welding. The core wire was 3.2 mm in diameter and 350 mm in length. The weight ratio of the covering to the core wire was about 40:100, and the diameter of the covered electrode was 5.4 mm.

REFERENCES 3 TO 5

Also as shown in Table 6, three kinds of covering material composition were prepared by decreasing the amount of Zr in the composition of Example 5 or increasing the amount of Zr in the composition of Example 8. The covering material compositions of References 3 to 5 were each applied to the aforementioned Fe—Ni core wire to produce covered electrodes for comparison with the covered electrodes of Examples 5 to 8.

TABLE 6

| | Covering Compositions (Wt %) | | | | | | |
|---|---|---|---|---|---|---|---|
| Constituents | Ex. 5 | Ex. 6 | Ex. 7 | Ex. 8 | Ref. 3 | Ref. 4 | Ref. 5 |
| Zr | 0.1 | 0.5 | 1.0 | 2.0 | 0.02 | 0.05 | 3.0 |
| Si | | 11 | | | | 11 | |
| B | | 2 | | | | 2 | |
| Nb | | 3 | | | | 3 | |
| C | | 3 | | | | 3 | |
| Fe | | 24 | | | | 24 | |
| Additives* & Impurity | 56.9 | 56.5 | 56.0 | 55.0 | 56.98 | 56.95 | 54.0 |

*Additives: calcium carbonate, barium carbonate, fluorite and mica.

Each of the covered electrodes produced in Examples 5 to 8 and References 3 to 5 were used in an alternating-current welding operation performed in the manner of build-up welding on a cast iron body used as base metal. Table 7 shows analytical values of the compositions of deposited metals given by these covered electrodes. The Vickers hardness values of the deposited metals, slag conditions and the results of the bead crack test described in the preceding Experiment are shown in the following Table 8.

For the deposited metals of Examples 5 to 8 and References 3 and 4, the wear resistance and antifrictional property were examined by the same test method as employed in Examples 1 to 4 and all evaluated to be excellent. The deposited metal of Reference 8 was excluded from the objective of the test and evaluation because adhesion of the slag to the deposited metal was so intense as to result in inclusion of slag in the deposited metal.

TABLE 7

| | Analysis of Deposited Metal (Wt %) | | | | | | |
|---|---|---|---|---|---|---|---|
| | C | Si | B | Nb | Zr | Ni | Fe | other |
| Ex. 5 | 0.82 | 5.3 | 0.25 | 1.58 | 0.011 | 46.3 | balance | <0.5 |
| Ex. 6 | 0.84 | 5.0 | 0.23 | 1.61 | 0.06 | 45.4 | balance | <0.5 |
| Ex. 7 | 0.81 | 4.9 | 0.26 | 1.54 | 0.13 | 46.2 | balance | <0.5 |
| Ex. 8 | 0.80 | 5.2 | 0.23 | 1.60 | 0.19 | 48.0 | balance | <0.5 |
| Ref. 3 | 0.85 | 5.0 | 0.24 | 1.57 | 0.003 | 47.7 | balance | <0.5 |
| Ref. 4 | 0.82 | 5.1 | 0.25 | 1.58 | 0.006 | 45.9 | balance | <0.5 |
| Ref. 5 | 0.81 | 5.0 | 0.24 | 1.60 | 0.22 | 45.3 | balance | <0.5 |

TABLE 8

| | Hardness of Deposited Metal (Hv) | Operability at Welding | Weld Crack | Total Evaluation |
|---|---|---|---|---|
| Ex. 5 | 285–314 | excellent | 5% | excellent |
| Ex. 6 | 274–296 | excellent | 0% | excellent |
| Ex. 7 | 282–320 | good | 0% | excellent |
| Ex. 8 | 287–332 | good, slight adhesion of slag | 0% | good |
| Ref. 3 | 287–320 | excellent | 50% | bad |
| Ref. 4 | 274–302 | excellent | 21% | tolerable |
| Ref. 5 | 290–334 | bad, intense adhesion of slag | 0% | bad |

Figure 3:
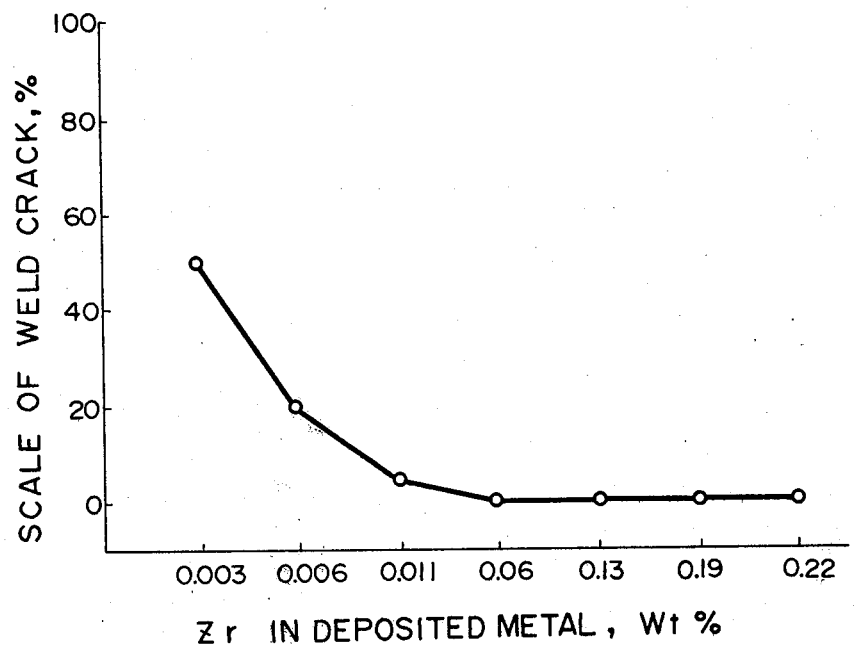
FIG. 3 is a graph showing the same relationship as in FIG. 2 observed in a separate experiment.

The relationship between the amount of Zr in the deposited metal (see Table 7) and the scale of weld cracks (see Table 8) is graphically shown in FIG. 3. It is apparent that also in the case of a covered electrode using a Fe—Ni core wire the presence of at least 0.01% of Zr in the deposited metal is quite effective for prevention of weld cracks.

Throughout the above presented Examples the objective of build-up welding by using a covered electrode according to the invention was cast iron in the form of a metal die for a press-shaping process or a related metal part, but this is by no means limitative. A covered electrode of the invention is also useful for build-up welding on other types of metal parts made of various ferrous materials other than cast iron and exhibits its advantages in every case. The diameters of the covered electrodes and the core wires and the weight ratio of the covering to the core wire in the above Examples are no more than exemplary. When, for instance, the covered electrodes of Examples were each modified by using a 4.0 mm diameter core wire (Ni wire or Fe—Ni wire) to have an outer diameter of 6.8 mm to perform build-up welding over relatively large areas at high efficiency, the results were as good as in Examples.

What is claimed is:

1. A covered electrode for shielded metal arc welding, the electrode consisting of a core wire and a covering and comprising such amounts of Ni, Si, B, Nb, C and Zr as essential alloying elements that deposited metal given by the covered electrode contains at least 40% by weight of Ni, 3 to 8% by weight of Si, 0.1 to 0.5% by weight of B, 0.3 to 2.0% by weight of Nb, 0.2 to 1.5% by weight of C and 0.01 to 0.20% by weight of Zr.

2. A covered electrode according to claim 1, wherein the balance of said deposited metal consists of Fe and inevitable impurities.

3. A covered electrode according to claim 1, wherein said core wire contains at least 95% by weight of Ni, said covering comprising 5 to 13% by weight of Si, 1 to 5% by weight of B, 0.4 to 4% by weight of Nb, 1 to 6% by weight of C and 0.1 to 2.0% by weight of Zr.

4. A covered electrode according to claim 3, wherein said covering further comprises Fe as an additional alloying element.

5. A covered electrode according to claim 1, wherein said core wire consists essentially of 50 to 60% by weight of Ni and the balance of Fe, said covering comprising 5 to 13% by weight of Si, 1 to 5% by weight of B, 0.4 to 4% by weight of Nb, 1 to 6% by weight of C and 0.1 to 2.0% by weight of Zr.

6. A covered electrode according to claim 5, wherein said covering further comprises Fe as an additional alloying element.

7. A covered electrode according to claim 3 or 5, wherein said covering further comprises at least one of arc-stabilizing agent, gas-generating agent, slag-forming agent and lubricating agent.

8. A covered electrode according to claim 7, wherein said covering comprises calcium carbonate, barium carbonate and fluorite.

9. A covered electrode according to claim 3 or 5, wherein the weight ratio of said covering to said core wire is in the range from about 20:100 to about 50:100.

* * * * *